(12) United States Patent
Sokołowski et al.

(10) Patent No.: US 12,459,312 B2
(45) Date of Patent: Nov. 4, 2025

(54) HEAT SHIELD PANEL RETAINER

(71) Applicant: GOODRICH CORPORATION, Charlotte, NC (US)

(72) Inventors: Marcin Szymon Sokołowski, Wojsławice-Kolonia (PL); Bartłomiej Kamil Żuk, Legnica (PL); Nathaniel J. Herrmann, Springfield, OH (US); John A. Stevenson, Cedarville, OH (US); Jerry Miller, Kettering, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 205 days.

(21) Appl. No.: 18/325,849

(22) Filed: May 30, 2023

(65) Prior Publication Data

US 2023/0408215 A1 Dec. 21, 2023

(30) Foreign Application Priority Data

Jun. 9, 2022 (EP) .................................... 22461570

(51) Int. Cl.
*B60C 23/18* (2006.01)
(52) U.S. Cl.
CPC .................................. *B60C 23/18* (2013.01)
(58) Field of Classification Search
CPC .......... B60C 23/18; B60C 23/19; B60B 19/10

USPC ......................................................... 301/6.3
See application file for complete search history.

(56) References Cited

U.S. PATENT DOCUMENTS

| 4,084,857 | A | 4/1978 | VanderVeen |
| 2003/0102710 | A1* | 6/2003 | Thorp ..................... F16D 55/36 |
| | | | 301/6.1 |
| 2020/0298965 | A1 | 9/2020 | Francis et al. |
| 2023/0398818 | A1* | 12/2023 | Sokolowski ............ B60C 23/18 |

FOREIGN PATENT DOCUMENTS

| EP | 1304240 | 4/2003 |
| EP | 3712054 | 9/2020 |
| EP | 3767125 | 1/2021 |

* cited by examiner

*Primary Examiner* — Rodney A Bonnette
(74) *Attorney, Agent, or Firm* — SNELL & WILMER L.L.P.

(57) ABSTRACT

A retainer for connecting two panels of a heat shield assembly, the retainer comprising: a central elongate panel having a length l and a width w, a top end, a bottom end and first and second long sides extending from the top end to the bottom end; a first side panel extending along the first long side of the central elongate panel and a second side panel extending along the second long side of the central elongate panel; and wherein reinforcement features are applied to a surface of the central elongate panel.

14 Claims, 3 Drawing Sheets

HEAT SHIELD PANEL RETAINER

CROSS-REFERENCE TO RELATED APPLICATIONS

This application claims priority to, and the benefit of, EP Patent Application No. 22461570.8, filed Jun. 9, 2022 and titled "HEAT SHIELD PANEL RETAINER," which is incorporated by reference herein in its entirety for all purposes.

FIELD

The present disclosure relates to a retainer for connecting panels or segments of a heat shield assembly for a wheel for a vehicle especially, but not exclusively, for an aircraft wheel.

BACKGROUND

Wheels on aircraft and other vehicles are often provided with a brake assembly comprising a stack of brake discs mounted inside the wheel, within the tube well of the wheel. The brake operates by compressing the brake discs together to slow and stop rotation of the wheel. The friction between the pressed brake discs generates a large amount of heat which can cause damage to the wheel and/or tires. It is conventional to provide a heat shield between the brake assembly and the wheel rim or tube well to reduce the effects of the heat generated by braking on the wheel parts. The heat shield can also catch hot brake material that is ejected from the brake discs during braking, before it strikes the wheel.

Various types of heat shield are known but, typically, heat shields are in the form of metal sheets or panels provided concentric with the wheel tube well and spaced a small distance from the tube well. The heat shield can be provided as a single cylindrical piece but more typically is formed as a number of arcuate panels or segments that are attached together to form a complete cylindrical heat shield.

Particularly with the increased use of carbon disc brakes, which have greater energy absorption capability than steel brakes and are significantly lighter, but which are larger than steel brake discs, it is important for the heat shields to be robust. There is, however, also a need for them to be as simple and lightweight as possible. In aircraft in particular, but also in other vehicles with braked wheels, there is a need to minimize the weight and size of the wheel assembly. Heat shields are therefore, often made of thin metal panels but may be arranged as two or more layers of panels with an insulation gap therebetween.

Because of the high temperature and high stress/vibrational environments that braked wheels operate in and high centrifugal forces acting on the heat shields, as well as changes in tire pressure, the heat shield can be caused to deform and/or deflect. This can cause high stresses on the heat shield and can cause the heat shield to come into contact with the wheel tube well which can, in turn, result in wheel abrasion. The connectors used to join adjacent panels comprise two engaging or interleaving hook parts resulting in a seam that is thicker than the individual panels themselves and the seams provide points around the heat shield that are even more likely to contact the wheel tube well during movement and/or if the heat shield panels are deflected or deformed. This is even more of an issue for carbon brakes because they are larger and so there is less space between the discs and the wheel. Flatter retainers have also been designed, that take the form of a central panel and side wings or panels. The central panel is provided with a hole at the top end through which a bolt can pass, and a foot at the bottom to be supported by a torque bar. The side panels extend partly across respective adjacent heat shield panels. The retainer and torque bar combine to connect/retain the heat shield panels. Such retainers are made of relatively thin sheets of metal to maintain a low profile. The retainer being thin, provides an area of weakness in the heat shield assembly, and is the area where the greatest deflection and plasticity appears. The retainer may not be strong enough to prevent deflection of the wings and the heat shield panels they support, in certain conditions. This can therefore lead to the heat shield panels making contact with the tube well, thus resulting in abrasion.

There is a need for a heat shield assembly which is less prone to deflection and deforming and also an improved retainer, so as to avoid or reduce damage to the heat shield and to avoid or reduce wheel abrasion.

SUMMARY

According to the present disclosure, there is provided a retainer for connecting two panels of a heat shield assembly, the retainer comprising: a central elongate panel having a length l and a width w, a top end, a bottom end and first and second long sides extending from the top end to the bottom end; a first side panel extending along the first long side of the central elongate panel and a second side panel extending along the second long side of the central elongate panel; and wherein reinforcement features are applied to a surface of the central elongate panel.

BRIEF DESCRIPTION OF THE DRAWINGS

The assembly according to the disclosure will be described, by way of example only, with reference to the drawings. Variations and modifications are possible within the scope of the claims.

DETAILED DESCRIPTION

Figure 1:
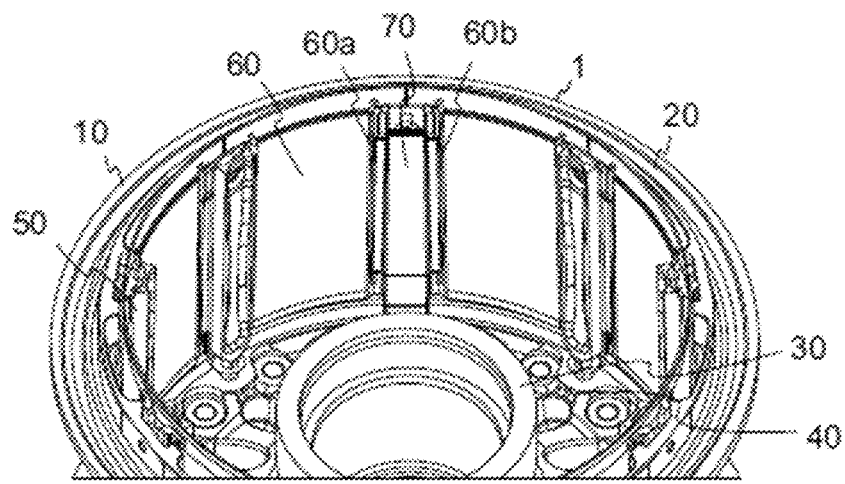
FIG. 1 shows an example of a heat shield in a wheel.

FIG. 1 shows a section of a typical wheel assembly comprising a wheel rim or tube well 1 having an outer diameter surface 10, on which a tire (not shown) will usually be mounted, and an inner diameter surface 20 defining an interior cavity in which a brake assembly (not shown) will typically be arranged around a wheel hub 30. The hub 30 would be attached by bearing to an axle (not shown). The hub 30 is connected to the wheel rim 1 via a web 40. Rotor disc drive lugs (or torque bars) 50 extend axially across the tube well 1 for engagement with the brake discs.

To protect the wheel rim 1 from the heat generated during hard braking or from brake disc material ejected during braking, a heat shield is mounted to the inner diameter surface of the wheel. The heat shield may be a single tubular shield or, as shown in this example, may be formed of several heat shield panels 60 provided between the rotor drive lugs 50. The heat shield/panels 60 is in the form of an arcuate thin metal sheet or several thin metal sheets and is attached to the wheel so as to be spaced apart from the wheel inner diameter surface by a small insulation gap (not shown). Where the heat shield is made of a number of panels or segments attached together, the adjoining edges 60*a*, 60*b* of the panels are connected and retained by means of retainers 70. The retainers 70 each define a seam between adjacent panels.

Figure 2:
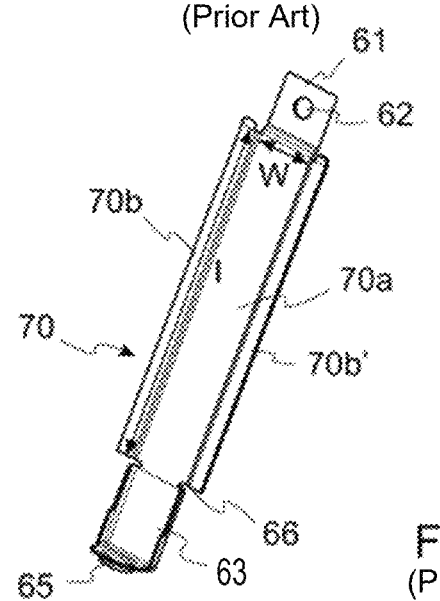
FIG. 2 shows a conventional retainer forming the connection between heat shield panels as in FIG. 1.
Figure 3:
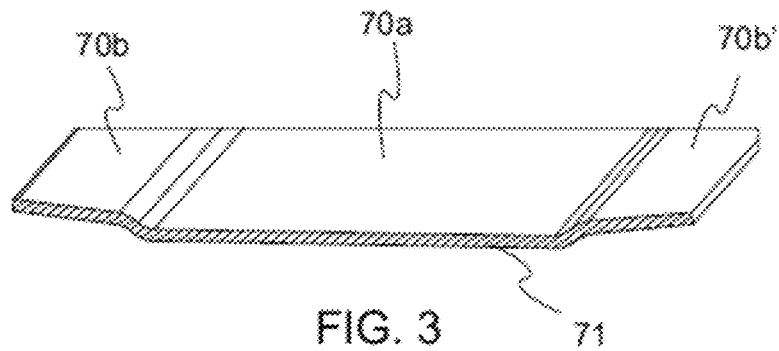
FIG. 3 shows a profile view of a retainer as shown in FIG. 2.

A typical retainer 70 is shown in FIGS. 2 and 3. Such a retainer is formed of a shaped metal sheet having a main panel 70*a* that, in use, will define the seam between two adjacent heat shield panels when positioned between their adjacent edges 60*a*, 60*b*. The main panel 70*a* has a length l and a width w essentially corresponding to the dimensions of a drive lug 50. The top of the main panel is provided with a tab 61 within which is formed a hole 62 to receive a bolt or fastener (not shown). The other end of the main panel is provided with a foot 63 to support the retainer in place against the lug 50. The foot 63 may also have a hole 65 therethrough, in which an end pin of the lug can be located. Typically, cut-outs 66 are formed between the main panel and the foot. Extending along each of the long sides of the main panel is a side panel or wing 70*b*, 70*b'*. A bend 71 provides the transition from the main panel 70*a* to the wing 70*b*, 70*b'*.

In use, the retainer is located between adjacent edges of adjacent heat shield segments such that the wings extend over part of the respective segment to retain the segments to form the circular heat shield at the appropriate distance from the tube well.

As mentioned above, in the harsh braking conditions experienced by e.g. wheels on an aircraft landing gear, high temperatures are reached and pieces of hot material can break off from the rotor discs. All of this can cause the heat shield panels to deform or deflect and be damaged and/or to contact the wall by being deflected into the insulation gap between the heat shield and the tube well interior surface. Because the retainer is made of relatively thin, light material, deformation of the panels can cause the retainer to deflect outwards and contact the wheel rim and this can result in damage and wheel abrasion. Also, if the retainers are not sufficiently strong to retain the heat shield panels in such conditions, the heat shield panels themselves can also contact the wheel. This can cause wheel abrasion and/or heat shield damage/abrasion and require the entire wheel assembly to be replaced.

Figure 4:
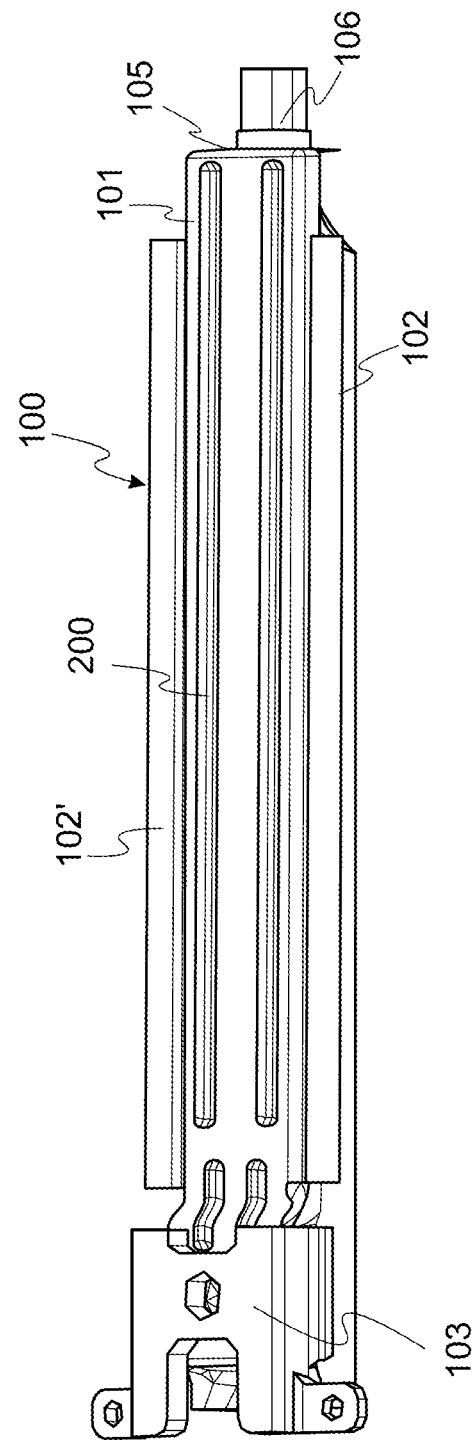
FIG. 4 is a view of a retainer according to the disclosure.
Figure 4A:
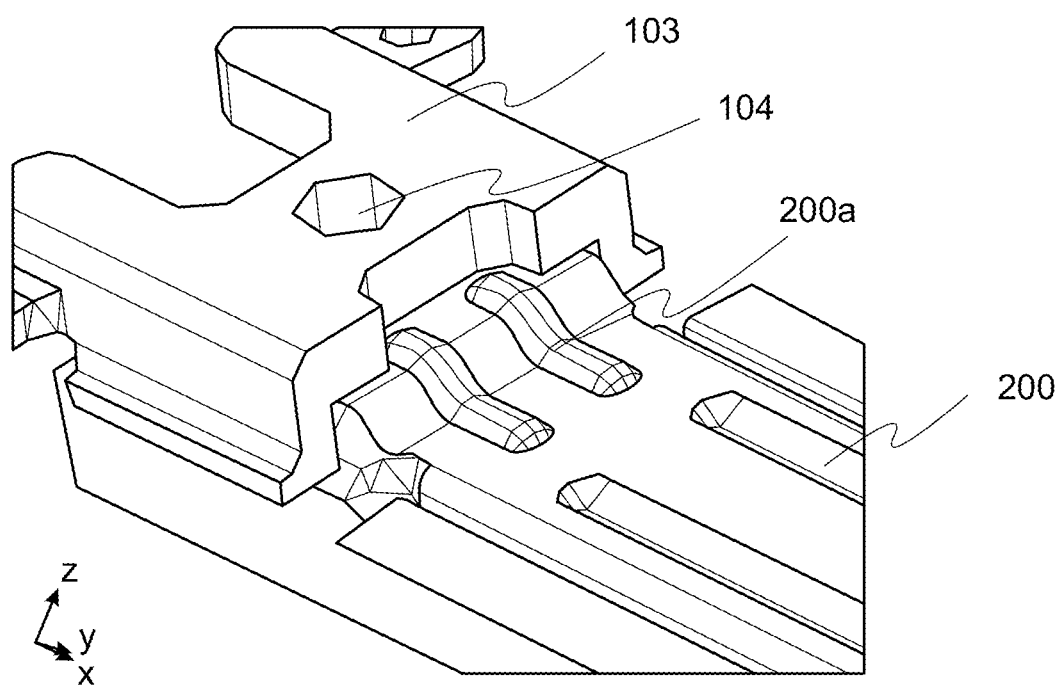
FIG. 4A is a detail of the top end of a retainer as shown in FIG. 4.

FIG. 4 shows a retainer 100 modified according to the disclosure to add stiffness and strength to the heat shield whilst minimizing the thickness of the retainer in the space between the heat shield and the wheel, so reducing the effects of deformation or deflection of the panel, to avoid or mitigate the problems mentioned above.

As shown in FIG. 4, the shape of the retainer is similar to that shown in FIGS. 2 and 3 in that the retainer 100 is formed of a sheet of metal shaped to define an elongate central panel 101 flanked by two side panels or wings 102, 102'. Similarly to the known design, one end of the central panel is provided with a tab 103 through which a fastener hole 104 may be formed and the other end of the central panel is formed as a foot 105 which may have a hole 106 therethrough to retain a torque bar (not shown). The central panel being formed by a flat metal sheet as in the known design. In an example, although not essential, additional stiffness may be provided to the weaker region between the central elongate panel and the wings by creating a U-shaped fold in the material between the central panel and the wing. The design of this disclosure modifies the existing design by providing reinforcing features onto the surface of the retainer, particularly on the central elongate panel, but possible also on the wings, at locations which are known to be vulnerable to deformation or deflection, to add strength and stiffness at those locations. In the example shown, the reinforcement features are in the form of strips or beads 200, 200*a* stamped onto the retainer sheet material. The beads or the like therefore add additional material at strategic locations to increase stiffness. The reinforcement features may have shapes other than strips or elongate beads, and may be e.g. square, rectangular, circular, oval or any other shape. They may be provided along the whole length of the retainer e.g. extending along the whole length of the central elongate panel and/or the wings or may be provided as segments or portions along the length and/or width of the retainer. In particular, areas of particular weakness e.g. at the transitions to the tab or foot, or close to the edges of the central elongate panel can be identified and provided with reinforcement features. Further, depending on the application/conditions of use/customer requirements, the depth and/or radius of the beads or the like can be varied to vary the resulting stiffness.

In one particular example, the reinforcement features are formed as smooth U- or V-shaped stiffening beads.

The retainer can be formed as a single piece, with the reinforcement features stamped onto the surface or attached by welding or adhesion or in other ways.

In addition to adding strength to the retainer, the raised profile of the stiffening features can increase the surface area of the retainer and so improves its thermal properties.

In use, the central panel 101 is located at the seam between adjoining edges of adjacent panels and the side panels 102, 102'; extend partially across the respective heat shield panel to retain the heat shield panels in the heat shield configuration and spaced from the tube well by the insulation gap. With the added stiffness and strength provided by the beading, if the heat shield panels deflect, the retainer will be strong and stiff enough to retain the heat shield panels away from the inner diameter of the tube well without the retainer or the heat shield panels contacting the wheel and causing abrasion.

The beading combines to increase the stiffness of the retainer, and so the depth of each individual beading can still be relatively small. The retainers in the space between the heat shield and the wheel rim, therefore, have a relatively small profile and are thus less likely to contact the wheel rim if the panel is deformed or deflected than in conventional assemblies. The modified retainer does not, therefore, take up any additional space compared to the known design.

In an example, each pair of adjacent heat shield panels is provided with a retainer between their adjoining edges. In other examples, two or more retainers may be positioned between each pair of heat shield panels.

To assemble the heat shield, two adjacent panels are connected by means of the retainer.

The retainer of this disclosure provides additional strength to the heat shield and a secure connection between heat shield panels, whilst minimizing the risk of wheel abrasion due to deformation or deflection of the panels.

What is claimed is:

1. A retainer for connecting two panels of a heat shield assembly, the retainer comprising:
    a central elongate panel having a length l and a width w,
       a top end, a bottom end and first and second long sides extending from the top end to the bottom end; and
    a first side panel extending along the first long side of the central elongate panel and a second side panel extending along the second long side of the central elongate panel, wherein reinforcement features are applied to a surface of the central elongate panel, and wherein the reinforcement features are beads stamped onto the surface of the retainer.

2. The retainer of claim 1, further comprising a tab extending from the top end.

3. The retainer of claim 2, further comprising a fastening hole formed in the tab.

4. The retainer of claim 1, further comprising a foot at the bottom end.

5. The retainer of claim 4, further comprising a locating hole in the foot.

6. The retainer of claim 1, the central elongate panel and the first and second side panels being formed from a single piece of sheet metal.

7. The retainer of claim 1, wherein the reinforcement features extend along the length of the retainer.

8. The retainer of claim 1, wherein the reinforcement means features are provided at discrete locations on the surface of the retainer.

9. A heat shield assembly for a wheel assembly, comprising a plurality of arcuate heat shield panels arranged to be connected together to form a heat shield to be attached to the interior of a wheel, and the retainer as claimed in claim 1, for attaching adjacent panels.

10. The heat shield assembly as claimed in claim 9, wherein one or more retainers is provided between each pair of adjacent panels.

11. The heat shield assembly of claim 9, wherein each panel comprises two heat shield panel layers arranged radially adjacent each other and wherein the retainer prevents relative movement of the two heat shield panel layers.

12. A wheel assembly comprising a wheel rim having a radially inner surface and a radially outer surface, and the heat shield assembly as claimed in claim 10, attached to and having the radially outer surface radially spaced from the radially inner surface of the wheel rim.

13. The wheel assembly of claim 12, further comprising a plurality of torque bars arranged around the radially inner surface of the heat shield, a torque bar positioned along the central elongate panel of each retainer of a plurality of retainers.

14. The wheel assembly of claim 12, being the wheel assembly is for a landing gear of an aircraft.

\* \* \* \* \*